(12) United States Patent
Barnes (10) Patent No.: US 12,301,703 B2
(45) Date of Patent: May 13, 2025

(54) END-TO-END SECURE COMMUNICATIONS WITH HISTORY

(71) Applicant: Cisco Technology, Inc., San Jose, CA (US)

(72) Inventor: Richard L. Barnes, Arlington, VA (US)

(*) Notice: Subject to any disclaimer, the term of this patent is extended or adjusted under 35 U.S.C. 154(b) by 184 days.

(21) Appl. No.: 17/484,827

(22) Filed: Sep. 24, 2021

(65) Prior Publication Data

US 2023/0102966 A1 Mar. 30, 2023

(51) Int. Cl.
*H04L 9/08* (2006.01)
*H04L 9/14* (2006.01)

(52) U.S. Cl.
CPC .......... *H04L 9/0822* (2013.01); *H04L 9/0861* (2013.01); *H04L 9/14* (2013.01)

(58) Field of Classification Search
CPC ....... H04L 9/0822; H04L 9/0861; H04L 9/14; H04L 2463/062; H04L 9/0833; H04L 63/065; H04L 9/0836; H04L 9/0866
See application file for complete search history.

(56) References Cited

U.S. PATENT DOCUMENTS

| 6,049,878 | A | 4/2000 | Caronni et al. | |
|---|---|---|---|---|
| 8,700,899 | B1* | 4/2014 | Juels | H04W 12/043 380/47 |
| 8,954,740 | B1 | 2/2015 | Moscaritolo et al. | |
| 9,871,775 | B2 | 1/2018 | Biggs et al. | |
| 10,855,440 | B1 | 12/2020 | Alwen et al. | |
| 10,992,455 | B2 | 4/2021 | Walling et al. | |
| 2009/0245517 | A1* | 10/2009 | Tinnakornsrisuphap | H04W 12/0433 380/278 |
| 2012/0243683 | A1* | 9/2012 | Oba | H04L 9/0836 380/255 |

(Continued)

FOREIGN PATENT DOCUMENTS

| EP | 0952718 A2 | 10/1999 | |
|---|---|---|---|
| EP | 1688858 A1 * | 8/2006 | ........... G06F 21/602 |
| JP | 2003273858 A | 9/2003 | |

OTHER PUBLICATIONS

"Group Encryption", online: https://developer.virgilsecurity.com/docs/e3kit/end-to-end-encryption/group-chat/, accessed Jul. 14, 2021, 5 pages, Virgil Security.

(Continued)

*Primary Examiner* — Mohammad W Reza (57) ABSTRACT

In one embodiment, an illustrative method herein may comprise: determining, by a device of a communication session, that a new epoch has occurred within the communication session, wherein the communication session has one or more member devices; generating, by the device and in response to the new epoch, a new key encryption key and a key bundle comprising one or more keys to decrypt content of the communication session from one or more previous epochs of the communication session; encrypting, by the device, the key bundle with the new key encryption key to create an encrypted key bundle; and sharing, from the device, the encrypted key bundle with the one or more member devices to allow the one or more member devices to access the content of the communication session from the one or more previous epochs.

18 Claims, 8 Drawing Sheets

(56) References Cited

U.S. PATENT DOCUMENTS

2014/0157382 A1* 6/2014 Ford .................. H04W 12/128
726/7

OTHER PUBLICATIONS

Forg F., "Master's Thesis Client-Side Encryption and Dynamic Group Management for a Secure Network Storage Service", Jul. 4, 2012, XP055246181,108 Pages, paragraph [0002], paragraph [03.5]-paragraph [03.7].
International Search Report and Written Opinion for International Application No. PCT/US2022/043408, mailed Jan. 3, 2023, 12 Pages.

* cited by examiner

{"typ": "message", "kid": "mls://clubhouse/0/0", ...}
<encrypted message>

{"typ": "bundle", "kid": "mls://clubhouse/1/kek", ...}
<encrypted key bundle>

{"typ": "message", "kid": "mls://clubhouse/1/0", ...}
<encrypted message>

{"typ": "file", "kid": "mls://clubhouse/1/1", ...}
<encrypted file>

{"typ": "message", "kid": "mls://clubhouse/1/2", ...}
<encrypted message>

{"typ": "bundle", "kid": "mls://clubhouse/2/kek", ...}
<encrypted key bundle>

{"typ": "message", "kid": "mls://clubhouse/2/1/1", ...}
<encrypted message>

END-TO-END SECURE COMMUNICATIONS WITH HISTORY

TECHNICAL FIELD

The present disclosure relates generally to computer networks, and, more particularly, to end-to-end secure communications with history.

BACKGROUND

Schools, businesses, and other entities are increasingly using online collaboration tools to facilitate communications between users. These collaboration tools range from text-based applications, such as instant messaging applications, Short Message Service (SMS) messaging, etc., to audio and/or video-based applications, such as video conferencing, and the like.

For security reasons, many communication sessions may be encrypted with various protocols in order to ensure that unauthorized users cannot access the content of the communication session. Additionally, modern systems for end-to-end secure group collaboration, in particular, are designed to ensure that a joining participant cannot decrypt content that was generated before they joined the group, nor content generated after they leave the group. In other words, a user is only able to see (e.g., decrypt) the content of a communication session from portions of the communication session during which that user was a participant of the session.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an illustrative method herein may comprise: determining, by a device of a communication session, that a new epoch has occurred within the communication session, wherein the communication session has one or more member devices; generating, by the device and in response to the new epoch, a new key encryption key and a key bundle comprising one or more keys to decrypt content of the communication session from one or more previous epochs of the communication session; encrypting, by the device, the key bundle with the new key encryption key to create an encrypted key bundle; and sharing, from the device, the encrypted key bundle with the one or more member devices to allow the one or more member devices to access the content of the communication session from the one or more previous epochs.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
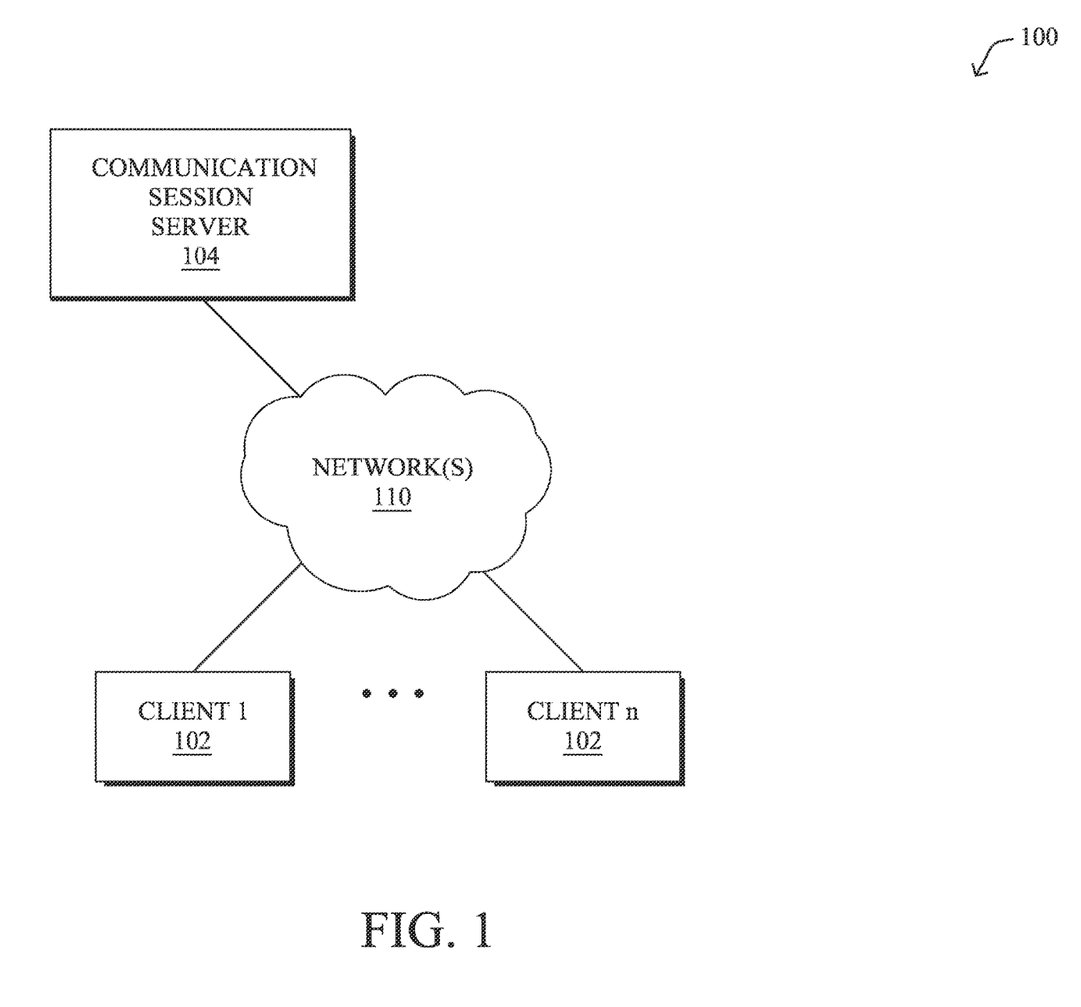
FIG. 1 illustrates an example communication network.

FIG. 1 is a schematic block diagram of an example simplified computing system 100 illustratively comprising any number of client devices 102 (e.g., a first through nth client device), and a communication session server 104, in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc.

Client devices 102 may include any number of user devices configured to participate in a real-time conference in which media data is exchanged between the participating devices (e.g., audio, video, text, etc.). For example, client devices 102 may include, but are not limited to, desktop computers, laptop computers, tablet devices, smart phones, wearable devices (e.g., heads up devices, smart watches, etc.), set-top devices, smart televisions, or any other form of computing device capable of participating in a real-time conference via network(s) 110. (Note also that in certain instances, the "client" for purposes of this invention may not be the end recipient of the communication, as may be appreciated by those skilled in the art, such as for private branch exchange (PBX), voice over IP (VoIP), session border controllers (SBCs), and other like implementations.)

Communication session server 104 may be configured to facilitate a conference between any number of client devices 102. In some embodiments, communication session server 104 may be a switched communication session server and selectively forward only a subset of the media data to the participants. For example, communication session server 104 may be configured to reduce the consumption of bandwidth and other resources by forwarding only a subset of the media data/flows to the conference participants. In some embodiments, communication session server 104 may be part of a cloud-based service. In such cases, communication session server 104 may represent the cloud-based device(s) that provide the conferencing services described herein with respect to communication session server 104.

Those skilled in the art will understand that any number of nodes, devices, links, etc. may be used in computing system 100, and that the view shown herein is for simplicity. For example, certain communication sessions may have additional components, such as various server-like components (e.g., a recording server, a telephony switch, or a session border controller), and so on. Also, those skilled in the art will further understand that while the network is shown in a certain orientation, the system 100 is merely an example illustration that is not meant to limit the disclosure.

Figure 2:
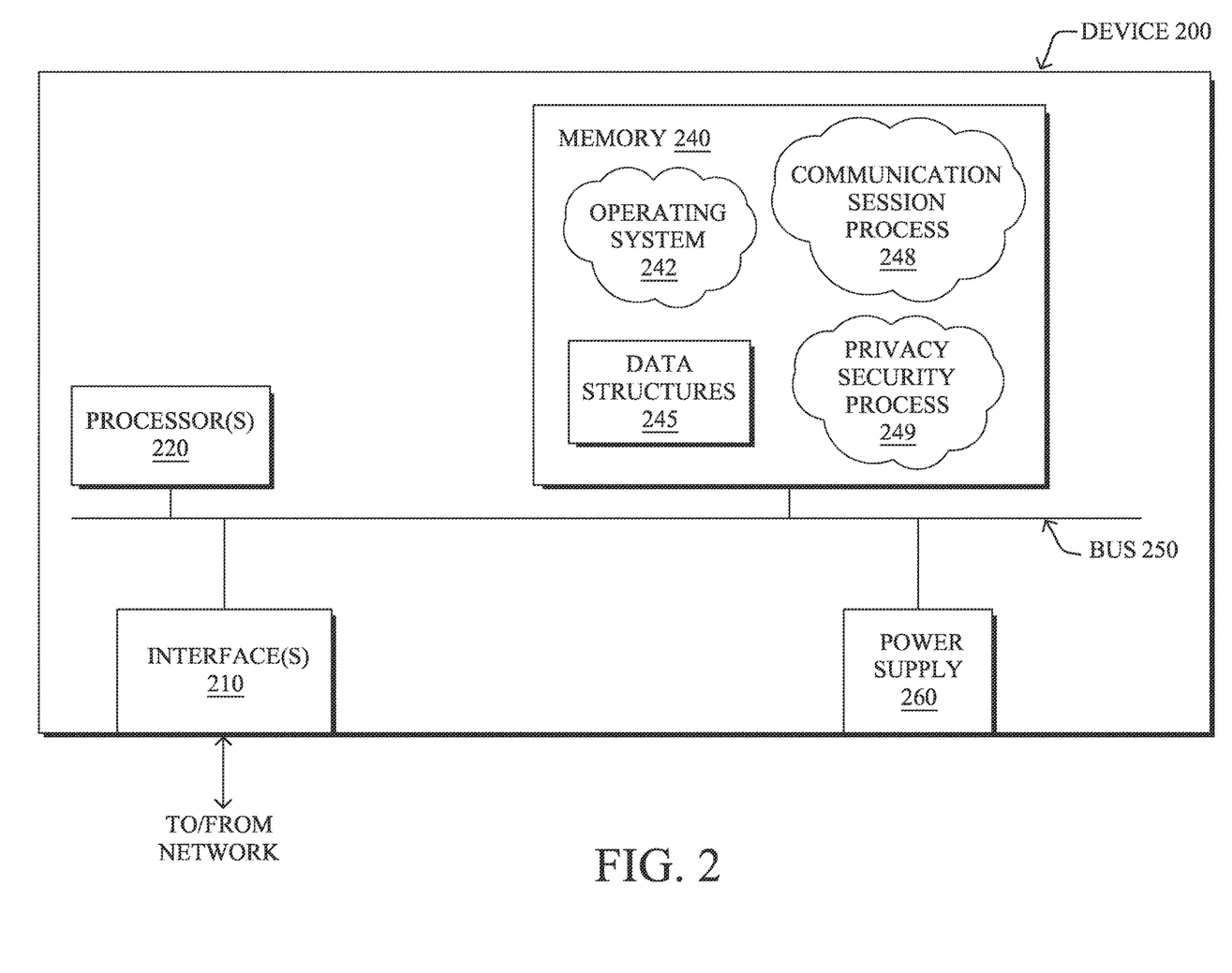
FIG. 2 illustrates an example computing device.

FIG. 2 is a schematic block diagram of an example node/device 200 that may be used with one or more embodiments described herein, e.g., as any of the devices 102-104 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a communication session process 248 and/or a privacy and security process 249, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Generally, communication session process 248, when executed by processor(s) 220 may be configured to enable a communication between any number of devices participating in a communication session, such as a real-time web conferences, chat applications, text messages, video group discussions, and so on. For example, when executed by a session participant, communication session process 248 may be operable to send data generated by local device 200 (e.g., media data such as audio, video, etc. and/or text, images, etc.) to any or all of the other participant devices (e.g., via, in part, a communication session server 104). Similarly, when data is received from another session participant, communication session process 248 may be operable to process the received data and/or present the data to a user via a user interface (e.g., a display, speaker, etc.).

As noted above, communication sessions may be encrypted with various protocols in order to ensure that unauthorized users cannot access the content of the communication session. As also noted above, modern systems for end-to-end secure group collaboration, in particular, are designed to ensure that a joining participant cannot decrypt content that was generated before they joined the group, nor content generated after they leave the group. In other words, a user is only able to see (e.g., decrypt) the content of a communication session from portions of the communication session during which that user was a participant of the session.

In particular, privacy and security process 249, when executed by processor(s) 220, may be configured to provide such privacy and security functions to a communication session managed by communication session process 248. For example, processes 248-249 may be configured to collaboratively encrypt/decrypt the media data conveyed during the communication session via one or more security protocols. For instance, keys for a group of participants in a communication session may be generated by a group authenticated key establishment (AKE) protocol. One example AKE protocol is the Messaging Layer Security (MLS) Protocol by Barnes et al. (currently Internet Engineering Task Force (IETF) draft "draft-ietf-mls-protocol-11"). In the illustrative MLS protocol, for example, a new key is produced for the group on key events such as joins or leaves, where each time the key changes, it initiates a new "epoch". (Note that in some AKEs, epochs are per-sender, where each sender decides when to change their own encryption key, as may be appreciated by those skilled in the art. One example of this is the known "Signal Protocol" or "TextSecure Protocol", which traditionally are based on 1:1 conversations, but there are widely-known techniques for using it for group communications.)

Notably, from the secrets produced by the AKE for an epoch, the application (e.g., the communication session process) derives one or more "content keys" that are used to protect content exchanged within the meeting (e.g., messages, files, whiteboard, media, etc.). Also, as in the illustrative MLS protocol, the keys used to encrypt content may be derived hierarchically from one or more intermediate keys.

When an item of content is shared, it is encrypted with a specific content key, and its encrypted representation is tagged with a "key ID" or "key URI" (uniform resource identifier) that uniquely identifies the content key (where the use of a URI is only one example type of identifier herein that uniquely identifies the epoch and the key within the epoch, and not a limiting example). According to AKE protocols, in particular, whenever a new participant joins a group communication session (e.g., as a "member"), a new specific epoch is initiated, along with new associated keys. The AKE will then ensure that the new member has access to the keys for the epoch in which the member is added, and all future epochs until that member is removed.

However, in many collaboration settings, there is a desire for new participants to be able to access content that was generated, added, etc., from before that participant joining the communication session (i.e., becoming a group member). Conventional techniques that allow participants that later join a communication session to access previous content involved complex storage of keys on a key management server. Other end-to-end secure messaging systems are primarily consumer-oriented and do not provide historical content to new joiners.

—End-to-End Secure Communications with History—

The techniques herein, therefore, provide end-to-end secure communications with history, where, illustratively, group members publish "key bundles" that encrypt historical keys with newer keys, such that new members can then decrypt these bundles to gain access to content protected with the historical keys. Specifically, in order to access an item of content shared in a prior epoch, the new member can now know which key was used to encrypt specific content from epochs prior to their joining, and how to access the particular key that was used to encrypt that specific content. Notably, as described in greater detail below, the techniques herein thus provide an approach for allowing participants to access previous communication session content without requiring a management server to manage the keys.

Specifically, according to one or more embodiments of the disclosure as described in detail below, an illustrative method herein may comprise: determining, by a device of a communication session, that a new epoch has occurred within the communication session, wherein the communication session has one or more member devices; generating, by the device and in response to the new epoch, a new key encryption key and a key bundle comprising one or more keys to decrypt content of the communication session from one or more previous epochs of the communication session; encrypting, by the device, the key bundle with the new key encryption key to create an encrypted key bundle; and sharing, from the device, the encrypted key bundle with the one or more member devices to allow the one or more member devices to access the content of the communication session from the one or more previous epochs.

Illustratively, the techniques described herein may be performed by hardware, software, and/or firmware, such as in accordance with the communication session process 248 and/or privacy and security process 249, which may include computer executable instructions executed by the processor 220 (or independent processor of interfaces 210) to perform functions relating to the techniques described herein, e.g., in conjunction with similar processes participating on other devices as described herein. In addition, the components herein may be implemented on a singular device or in a distributed manner, in which case the combination of executing devices can be viewed as their own singular "device" for purposes of executing the processes 248/249.

As noted above, secure encryption keys change in traditional end-to-end (E2E) encrypted communication sessions whenever someone (a "member device") enters or leaves the session, such as in accordance with the example MLS protocol. The techniques herein share earlier keys with a new member joining a communication session without exposing those keys to anyone outside of the session (e.g., the cloud). As described in greater detail below, embodiments herein thus allow the "later joining members" to go back in time through the prior linear history of a communication session (e.g., messages, text, side chat, shared files, stored video (e.g., saved as cyphertext), etc., from before the that member joined), particularly based on techniques that encrypt "old" keys with "new" keys in a manner that securely provides those later joining members the ability to decrypt the earlier material, accordingly.

Operationally, is should first be noted that key URIs in the embodiments herein may be used to provide instructions for locating and/or deriving a key of interest. For instance, a key URI herein may comprise an identifier for the group and epoch in which the key was derived, an identifier for the sender that set the key, if epochs are per-sender, a label for the specific key, if there is more than one, and any information input to key derivation, such as if the key was hierarchically derived. For example, in a scheme where content keys are derived first per-sender, then according file type and file identifier, example key URIs may look like:
  a) webex+mls://group-id/epoch/label/info/salt; or
  b) webex+mls://9b400b8c-b75a-4059-85db-a8ac669a6d90/3/alice/files/552b9702-eed7-46cd-8bec-74d9a91e6fd3.

According to the techniques herein, when a particular member of the group (e.g., a member device, such as client device 102) initiates a new epoch within the communication session (e.g., by adding or removing someone/a member device), that particular member generates a "Key Encryption Key" (KEK) for the new epoch, and also computes a "key bundle" containing a set of one or more past keys that may be used to correspondingly decrypt the prior portions of the communication session, as described in greater detail below. Specifically, the particular member then encrypts the key bundle with the KEK for the new epoch, and publishes the encrypted key bundle for the other members of the communication session. In one embodiment, the key bundle may be published using the communication session to convey the key bundle, such as an event in the collaboration platform (e.g., alongside messages, etc.). In another embodiment, the member may publish the key bundle on a dedicated server, such as the communication session server 104 or other server connected via network 110.

Notably, when a member of the group is notified that a new member has joined of its own initiative (thus initiating a new epoch without the action of an existing member, like above), that member may be configured to check to see if an encrypted key bundle has been posted for the new epoch (e.g., published within the communication session or on a dedicated server), and if not, may compute and publish an encrypted key bundle itself, accordingly.

Regarding the encrypted key bundles, in particular, as well as regarding the set of one or more past keys that may be used to correspondingly decrypt the prior portions of the communication session, reference is now made to FIGS. 3-6. As shown, an example key schedule 310 is shown across a number of epochs (E) shown as $E_0$, $E_1$, $E_2$, and $E_3$, which may have had transitions from one epoch to the next according to membership changes, as mentioned above. Specifically, in the example, assume that the first epoch, $E_0$, has a content key (CK) $CK_0$ and a key encryption key (KEK) $KEK_0$ for its associated content (e.g., messages). Assume next that after a membership change (e.g., a new member is added), epoch $E_1$ now has content keys $CK_{1,0}$ (e.g., for messages), $CK_{1,1}$ (e.g., for files), and $CK_{1,2}$ (e.g., for a video), along with a new associated $KEK_1$. After another membership change (e.g., another new member is added), epoch $E_2$ has updated content keys $CK_{2,0}$ (e.g., for messages), $CK_{2,1}$ (e.g., for files), and hierarchically lower content keys $CK_{2,1,0}$ and $CK_{2,1,1}$ (e.g., for specific files). Epoch $E_2$ also has an updated $KEK_2$ as per the techniques herein. Lastly, example epoch $E_3$ (e.g., after a member has left) has new content key $CK_3$ (e.g., for messages), and a corresponding new $KEK_3$.

As also shown in FIGS. 3-6, and as detailed below, all key bundles contain all content keys (CKs) generated during the previous epoch, and are encrypted with a key encryption key (KEK) for the current epoch. Then, depending upon a specific implementation within each of the FIGS. 3-6 below, the key bundles themselves may contain other keys as may be needed, according to the techniques herein. As such, when a member of the group then wishes to access an item of content, it uses the key URI to examine a local store of content keys to see if it has enough information to derive the key needed to decrypt the content, or if not, it retrieves the key bundles to get the indicated content key, depending on how key bundles are structured (as outlined below), accordingly.

Figure 3:
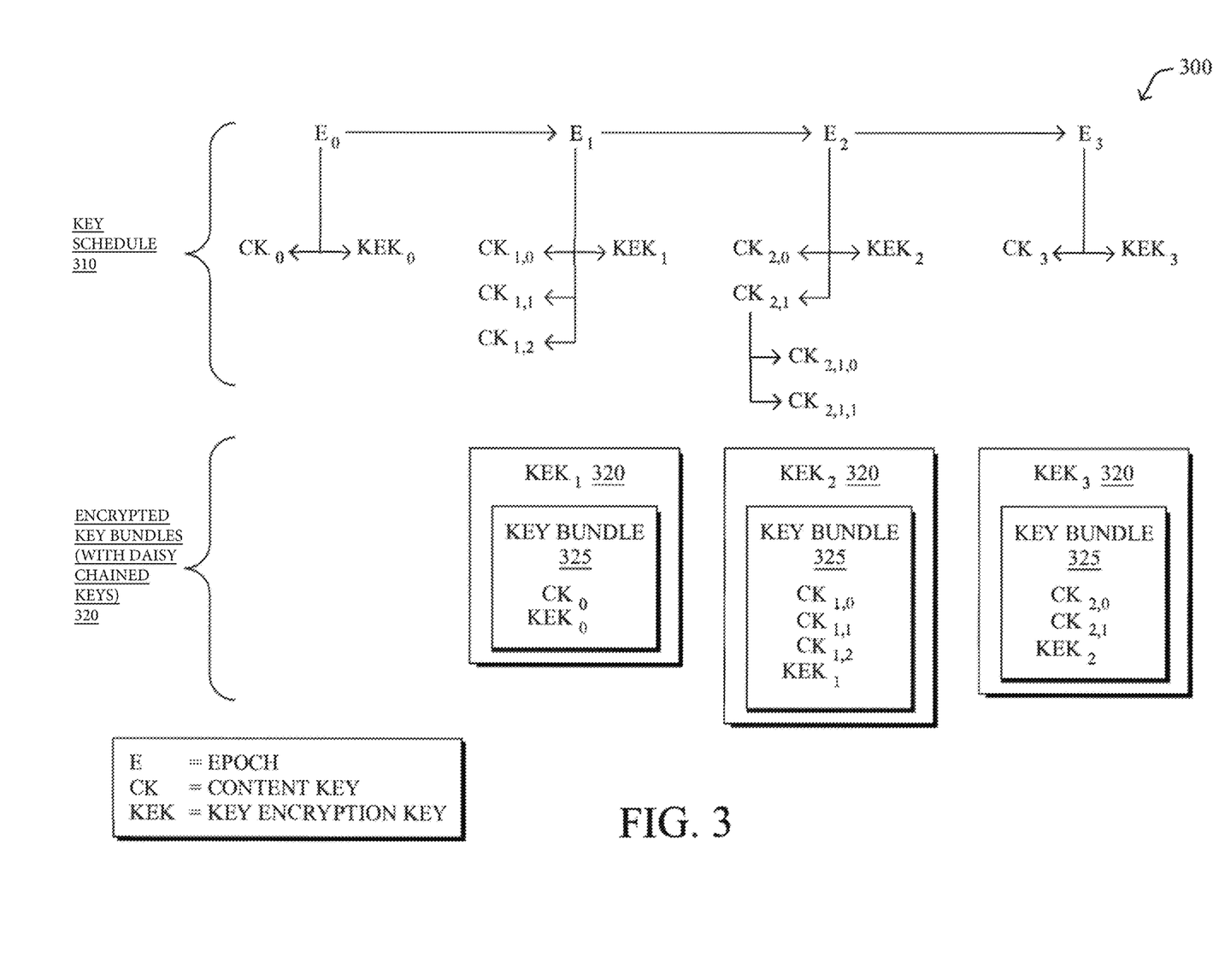
FIG. 3 illustrates an example of a key schedule and one type of key bundle with daisy chained keys for end-to-end secure communications with history.

In particular, in a first embodiment herein, as shown in example 300 of FIG. 3, a system of "daisy-chaining" the key encryption keys may be used, where encrypted key bundles 320 may use a current key encryption key (e.g., $KEK_3$ during epoch $E_3$) to encrypt a key bundle 325 comprising all content keys from the previous epoch (e.g., $CK_{2,0}$ and $CK_{2,1}$ from $E_2$), and the KEK for the previous epoch (e.g., $KEK_2$ from epoch $E_2$). (Note that "all content keys" in this instance demonstrates the use of hierarchical keys, which is described in greater detail below in FIG. 6). According to this daisy-chaining embodiment, when a member does not have enough information to derive the key needed to decrypt specific prior content (e.g., assume something that occurred in epoch $E_0$ prior to this particular member joining the communication session in epoch $E_3$), then this particular member retrieves the key bundles to get the need content key by retrieving and decrypting the current key bundle (e.g., decrypting the key bundle within epoch $E_3$, which corresponds to the keys of epoch $E_2$, with $KEK_3$ to obtain $KEK_2$), and each previous key bundle (in order) until it reaches the key bundle corresponding to the epoch listed in the key URI (e.g., then decrypting the key bundle within $E_2$ with $KEK_2$ to obtain $KEK_1$, which can then be used to decrypt the key bundle of $E_1$ to obtain the needed content key $CK_0$). Note that had this member joined in a previous epoch (e.g., $E_2$), then it may be possible for this member to begin the daisy chaining described above from the key bundle in $E_2$, accordingly, as it may already have $KEK_2$ stored locally from its corresponding membership in epoch $E_2$. Note also that had the content been from epoch $E_1$, for example, then the daisy-chaining for a member that joined in $E_3$ could have stopped at the decryption of the key bundle from $E_2$, which exposes all of the content keys from $E_1$, accordingly.

Figure 4:
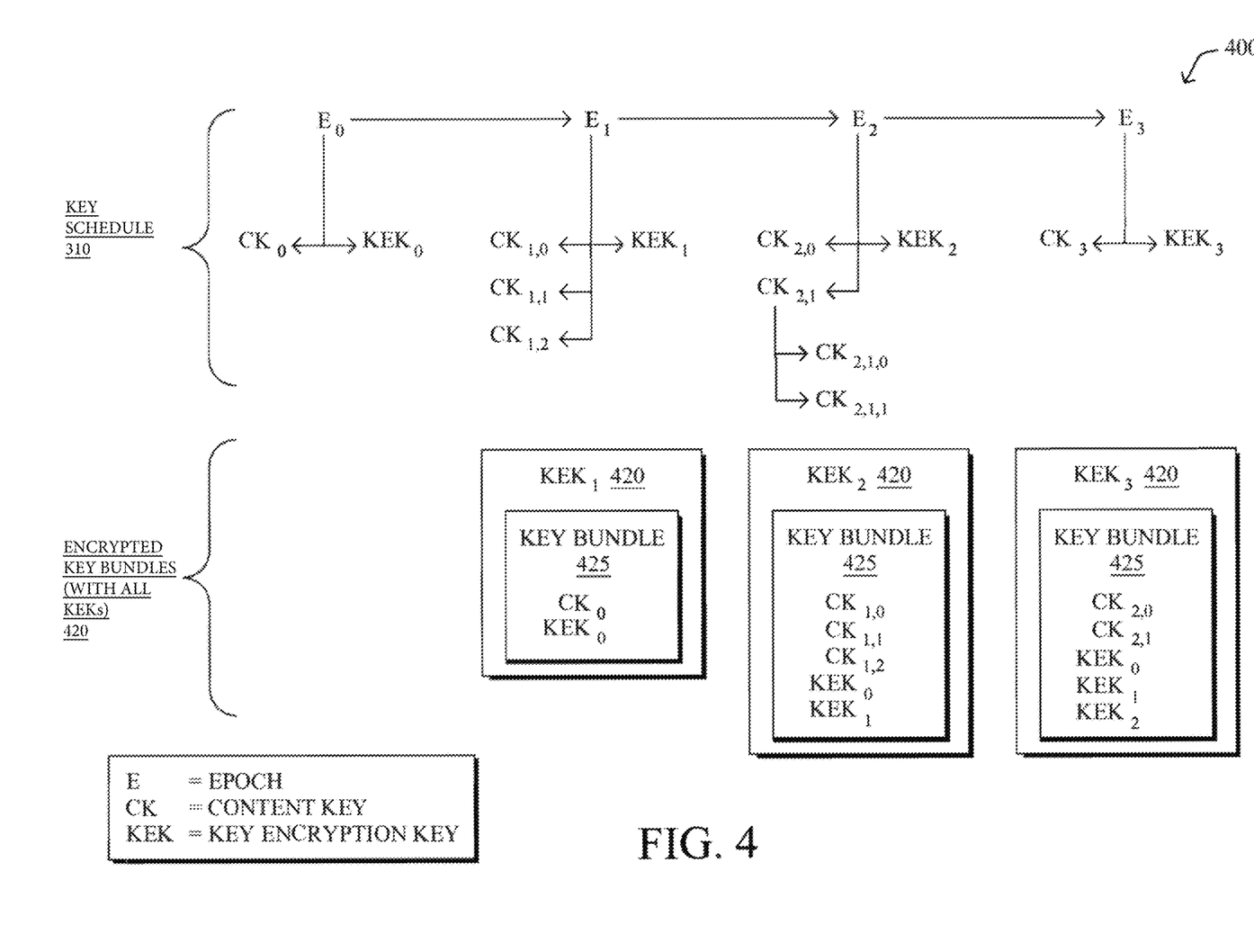
FIG. 4 illustrates an example of the key schedule and another type of key bundle with all key encryption keys for end-to-end secure communications with history.

Additionally, in a second particular embodiment herein, as shown in example 400 of FIG. 4, a system of providing all prior key encryption keys may be used, where encrypted key bundles 420 may still use a current key encryption key (e.g., $KEK_3$ during epoch $E_3$) to encrypt a key bundle 425, still comprising all content keys from the previous epoch (e.g., $CK_{2,0}$ and $CK_{2,1}$), and now also comprising all previous KEKs for the previous epochs (e.g., $KEK_0$ from epoch $E_0$, $KEK_1$ from epoch $E_1$, and $KEK_2$ from epoch $E_2$). According to this second "all KEKs" embodiment, when a member does not have enough information to derive the key needed to decrypt specific prior content (e.g., again assume something that occurred in epoch $E_0$ prior to this particular member joining the communication session in epoch $E_3$), then this particular member directly retrieves the needed key bundle to get the content key, specifically by retrieving and decrypting the current key bundle to obtain the desired key encryption key (e.g., $KEK_1$) for decrypting the key bundle of the epoch listed in the key URI (e.g., to decrypt the key bundle within $E_1$ exposing the keys of $E_0$), to obtain the needed content key (e.g., $CK_0$). Note again that had this member joined in a previous epoch (e.g., $E_2$), then it may be possible for this member to have decrypted either the key bundle within $E_2$ (using $KEK_2$) or, as mentioned above, the current key bundle within $E_3$ (using $KEK_3$) to obtain $KEK_1$ for decrypting the key bundle within $E_1$, accordingly. (That is, the use of the current key encryption key and current key bundle in this embodiment is one example not meant to be limiting to the scope of the present disclosure.)

Figure 5:
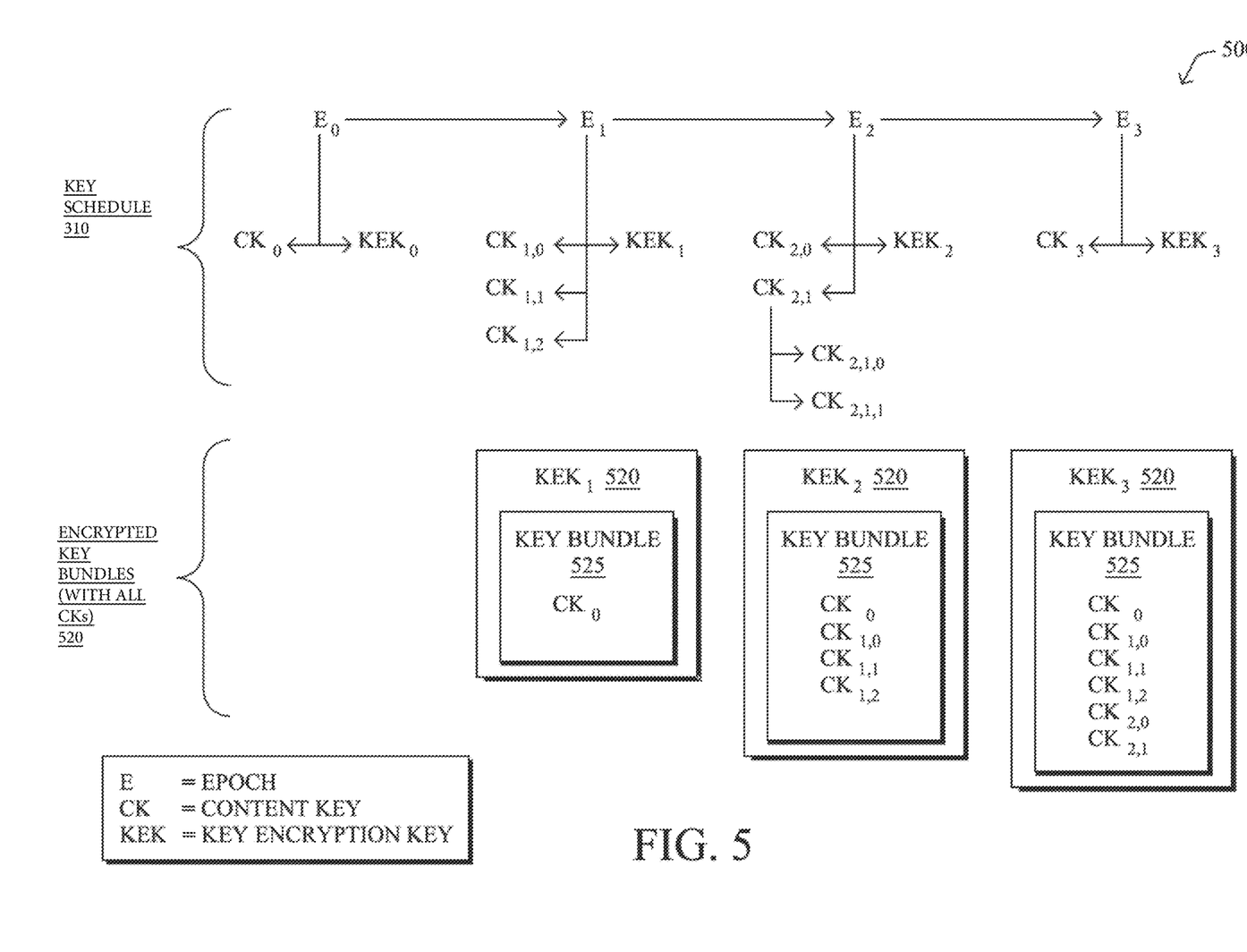
FIG. 5 illustrates an example of the key schedule and still another type of key bundle with all content keys for end-to-end secure communications with history.
Figure 6:
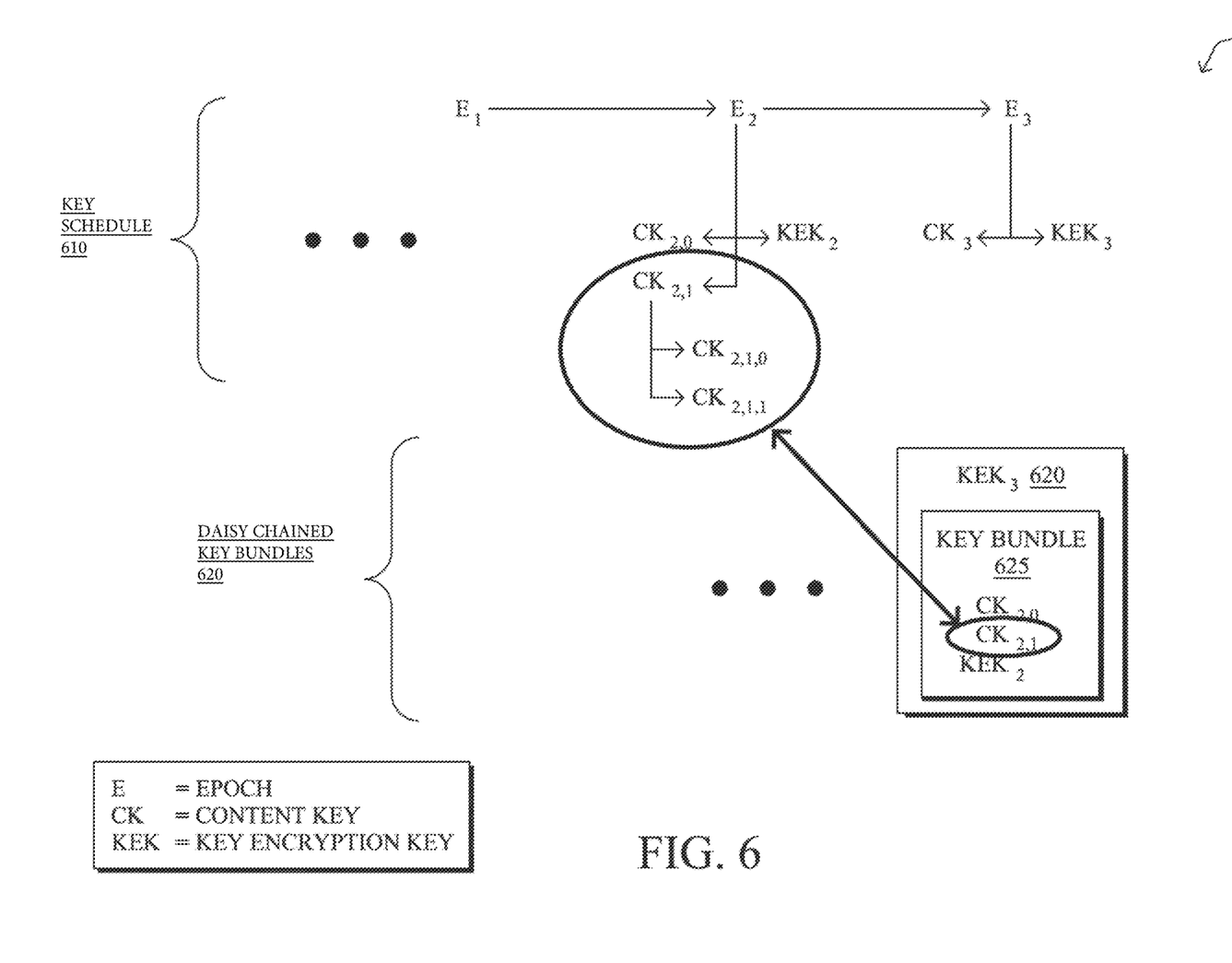
FIG. 6 illustrates an example of hierarchical content keys.

In still another embodiment herein, a third embodiment, as shown in example 500 of FIG. 5, provides all prior content keys from all previous epochs. That is, encrypted key bundles 520 may still use a current key encryption key (e.g., $KEK_3$ during epoch $E_3$) to encrypt a key bundle 525, but here all content keys from all previous epochs (e.g., $CK_0$, $CK_{1,0}$, $CK_{1,1}$, $CK_{1,2}$, $CK_{2,0}$, and $CK_{2,1}$), and no previous KEKs for the previous epochs are needed. According to this third "all CKs" embodiment, when a member does not have enough information to derive the key needed to decrypt specific prior content (e.g., again assume something that occurred in epoch $E_0$ prior to this particular member joining the communication session in epoch $E_3$), then this particular member directly retrieves the content key needed by retrieving and decrypting the current key bundle to obtain the needed content key (e.g., $CK_0$).

The particular selection and implementation of the above three embodiments may be based on a number of factors, such as memory allocations, file sizes (e.g., number of keys overall within a bundle), frequency of epochs (e.g., number of KEKs that would be produced over time), whether the keys are passed within the communication session or stored on a remote server, and so on. Accordingly, the techniques herein may use any one (or more) of the embodiments above to generate key bundles comprising one or more keys to decrypt content of the communication session from one or more previous epochs of the communication session, where key bundles, once decrypted, allow member devices to access the content of the communication session from previous epochs, according to whichever of the embodiments above is specifically implemented (e.g., daisy-chaining, all KEKs, or all CKs). Note also that still further embodiments may be conceived, and such embodiments may be considered to be additional alternatives or additions to those described above, and the techniques herein are not limited to the three embodiments disclosed above.

Regarding hierarchical content keys, as mentioned above, FIG. 6 illustrates an abbreviated example 600 of a key schedule 610 and the daisy chained keys example where encrypted key bundles 620 have key bundles 625 that may contain one or more hierarchical content keys. In this instance, where content keys are derived hierarchically, then the key bundle 625 need only contain enough keys so that the remainder can be derived. As such, if content keys are hierarchically derived, then the member uses the derivation information in the key URI to derive the key used to encrypt the content. For example, as shown, if the needed content key is one of either $CK_{2,1,0}$ or $CK_{2,1,1}$, then only $CK_{2,1}$ is needed, which is within the encrypted key bundle of epoch $E_3$, (encrypting the key bundle with keys for epoch $E_2$), and may be obtained using any of the techniques described above, accordingly.

Figure 7:
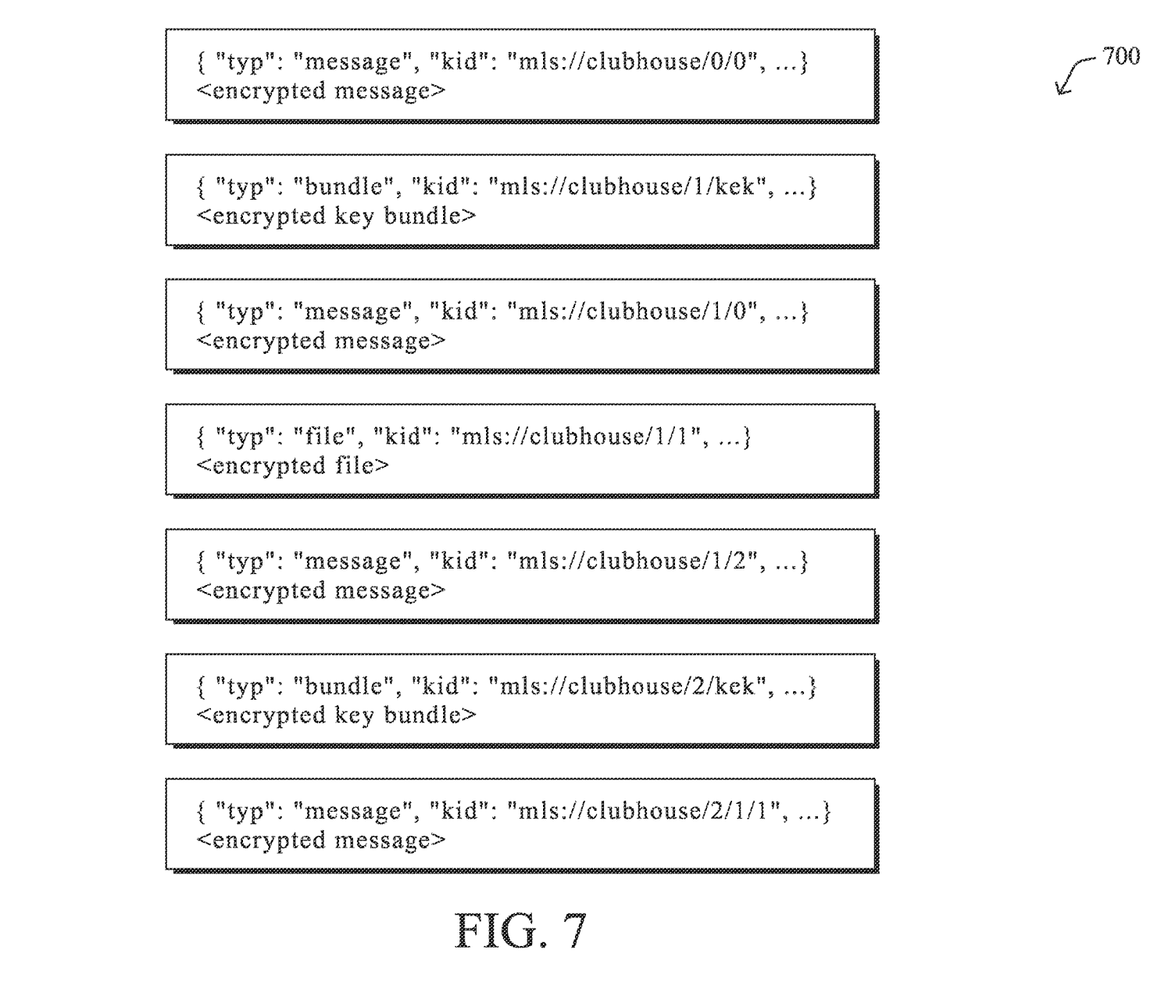
FIG. 7 illustrates a series of data structures for passing key identifiers (KIDs) for end-to-end secure communications with history.

For reference, FIG. 7 illustrates a series of data structures 700 for passing key identifiers (KIDs) according to one or more embodiments of the present disclosure described above. For example, the data structures may comprise a type ("typ") field comprising a variety of options, such as "message", "bundle", "file", etc., along with the corresponding KID (e.g., "mls://clubhouse/0/0" for an encrypted message, "mls://clubhouse/1/kek" for an encrypted key bundle, and so on as shown). Note that while FIG. 7 demonstrates an illustrative syntax based on the MLS protocol, those skilled in the art will appreciate that FIG. 7 is merely meant as an example for understanding the techniques herein and how they may be implemented, and the MLS protocol and/or the syntax shown are not meant to limit the scope of the present disclosure.

Notably, while the above description has addressed members having access to content from before their joining (or from previous epochs, generally), the techniques herein may also be used when a particular member leaves the communication session prior to its end (e.g., for recorded sessions). In particular, the techniques herein may share a final encrypted key bundle of the communication session after the end of the communication session (with one or more particular members that left prior to a final epoch) to allow members to access a remainder of content of the communication session (e.g., occurring after the member device left the communication session). For instance, using any of the embodiments described above, a member leaving prior to the end of a communication session (e.g., during epoch $E_1$) may then receive a final encrypted key bundle from a new epoch "$E_4$" (which would have the keys from epoch $E_3$) to be able to then decrypt the content from any of the subsequent epochs (e.g., $E_2$ or $E_3$), accordingly. In this instance, since the member left the session early, the associated encrypting key encryption key for the final encrypted key bundle may either also be a new key (e.g., "$KEK_4$") that is shared securely with the member, or may be encrypted with a key encryption key from a last known epoch for the particular user (e.g., using $KEK_1$ from epoch $E_1$).

Figure 8:
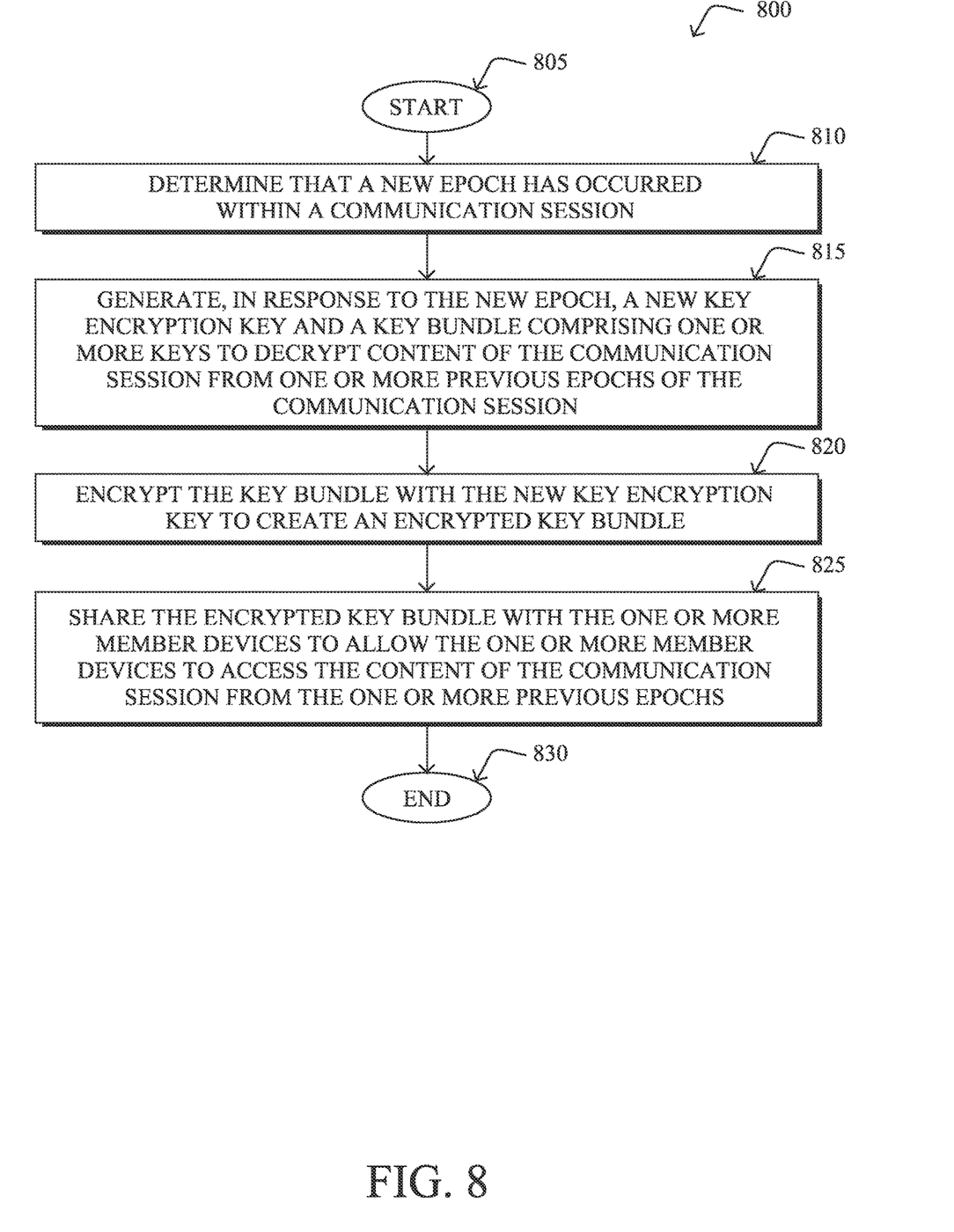
FIG. 8 illustrates an example simplified procedure for end-to-end secure communications with history.

FIG. 8 illustrates an example simplified procedure for end-to-end secure communications with history in accordance with one or more embodiments described herein. For example, a non-generic, specifically configured device (e.g., device 200) may perform procedure 800 by executing stored instructions (e.g., process 248). The procedure 800 may start at step 805, and continues to step 810, where, as described in greater detail above, a device of a communication session (e.g., a member device, a server, etc.) determines that a new epoch has occurred within the communication session. Notably, as described above, determining that the new epoch has occurred within the communication session may be caused by the device or detected by the device, and may be based on a change in the one or more member devices, such as an existing member of the one or more member devices changing membership, and an external joining member into the one or more member devices of the communication session, and so on.

In step 815, in response to the new epoch, the device generates both a new key encryption key and a key bundle, where the key bundle, which may be either per-sender or per-group, comprises one or more keys (e.g., key encryption keys and/or content keys, as described herein) to decrypt content of the communication session from one or more previous epochs of the communication session. That is, as detailed above, the techniques herein may generate a data structure of single or multiple content keys, or, notably, some secret from which content keys are derived. For instance, in one embodiment (e.g., FIG. 3 above), the key bundle comprises a last key encryption key for a last key bundle for a last epoch of the communication session, where the one or more member devices are configured to daisy-chain backward to obtain one or more further previous key encryption keys for one or more corresponding further previous key bundles for one or more further previous epochs of the communication session. In another embodiment (e.g., FIG. 4 above), the key bundle comprises all previous key encryption keys from all previous epochs of the communication session. In still another embodiment, (e.g., FIG. 5 above), the key bundle comprises all previous content keys from all previous epochs of the communication session.

Also, where the key bundle is based on hierarchical content keys, the key bundle may comprise a subset of a plurality of content keys from at least a last epoch of the one or more previous epochs of the communication session, the subset of the plurality of content keys sufficient to allow derivation of a remainder of the plurality of content keys from at least the last epoch. Alternatively, where the key bundle is based on independent content keys, the key bundle may comprise all of a plurality of content keys from at least a last epoch of the one or more previous epochs of the communication session.

In step 820, the device may then encrypt the key bundle with the new key encryption key to create an encrypted key bundle, such that in step 820 the device may then share the encrypted key bundle with the one or more member devices to allow the one or more member devices to access the content of the communication session from the one or more previous epochs. That is, such publishing of the encrypted key bundle may be performed at the end of an epoch (e.g., when an existing member makes a change to the group), or during an epoch (e.g., in the case of an external join). Also, the sharing may occur either within the communication session (e.g., in the messaging stream) or through a server access (e.g., an independent server, the communication server, etc.). Moreover, as detailed above, the sharing may be based on using a URI or similar text string to label keys distributed in this manner (e.g., Group ID, epoch, specific key, information for deriving from that key, etc.).

The simplified procedure 800 may then end in step 830, accordingly, notably with the ability to continue the process for new epochs by returning to start 805, accordingly. Other steps may also be included generally within procedure 800. For example, such steps (or, more generally, such additions to steps already specifically illustrated above), may include: distributing information that allows the one or more member devices to derive the new key encryption key; sharing, after the end of the communication session and in response to a particular member device leaving the communication session prior to an end of the communication session, a final encrypted key bundle of the communication session with the particular member device to allow the particular member device to access a remainder of content of the communication session occurring after the particular member device left the communication session; and so on.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for end-to-end secure communications with history. In particular, the techniques described above allow members of an end-to-end (E2E) encrypted group communication (e.g., high security communication applications) to access content from before they joined by publishing encrypted key bundles, thus providing an approach for allowing participants to access previous communication session content without requiring a management server to manage the keys. Specifically, in one or more illustrative embodiments herein, the conventional MLS protocol is enhanced to provide the extended visibility into earlier epochs of the communication sessions, while still maintaining the security features of the MLS protocol, accordingly. Conventional E2E encrypted protocols, on the other hand, merely allow members to see communications from times during which they were present in the session.

While there have been shown and described illustrative embodiments that provide for end-to-end secure communications with history, it is to be understood that various other adaptations and modifications may be made within scope of the embodiments herein. For example, while certain embodiments are described herein with respect to using certain protocols and network configurations for communication sessions, the techniques herein are not limited as such and may be used with other such protocols and networks, in other embodiments. For instance, the MLS protocol, in particular, is merely one example of a key encrypting protocol for end-to-end communications, and other suitable protocols may also be used in accordance with one or more embodiments of the present disclosure. In addition, while certain encryption/decryption techniques and/or protocols are mentioned above, these are merely illustrative examples that may utilize the techniques herein, and are not meant to limit the scope of the present disclosure.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

According to one or more particular embodiments herein, a method herein may comprise: determining, by a device of a communication session, that a new epoch has occurred within the communication session, wherein the communication session has one or more member devices; generating, by the device and in response to the new epoch, a new key encryption key and a key bundle comprising one or more keys to decrypt content of the communication session from one or more previous epochs of the communication session; encrypting, by the device, the key bundle with the new key encryption key to create an encrypted key bundle; and sharing, from the device, the encrypted key bundle with the one or more member devices to allow the one or more member devices to access the content of the communication session from the one or more previous epochs.

In one embodiment, the key bundle is based on hierarchical content keys, and wherein the key bundle comprises a subset of a plurality of content keys from at least a last epoch of the one or more previous epochs of the communication session, the subset of the plurality of content keys sufficient to allow derivation of a remainder of the plurality of content keys from at least the last epoch.

In one embodiment, the key bundle is based on independent content keys, and wherein the key bundle comprises all of a plurality of content keys from at least a last epoch of the one or more previous epochs of the communication session.

In one embodiment, the key bundle comprises a last key encryption key for a last key bundle for a last epoch of the communication session, wherein the one or more member devices are configured to daisy-chain backward to obtain one or more further previous key encryption keys for one or more corresponding further previous key bundles for one or more further previous epochs of the communication session.

In one embodiment, the key bundle comprises all previous key encryption keys from all previous epochs of the communication session.

In one embodiment, the key bundle comprises all previous content keys from all previous epochs of the communication session.

In one embodiment, sharing the encrypted key bundle occurs either within the communication session or through a server access.

In one embodiment, sharing further comprises: distributing information that allows the one or more member devices to derive the new key encryption key.

In one embodiment, determining that the new epoch has occurred within the communication session is either caused by the device or detected by the device.

In one embodiment, determining that the new epoch has occurred within the communication session is based on a change in the one or more member devices selected from a group consisting of: an existing member of the one or more member devices changing membership; and an external joining member into the one or more member devices.

In one embodiment, the key bundle is one of either per-sender or per-group.

In one embodiment, in response to a particular member device leaving the communication session prior to an end of the communication session, the method further comprises: sharing, after the end of the communication session, a final encrypted key bundle of the communication session with the particular member device to allow the particular member device to access a remainder of content of the communication session occurring after the particular member device left the communication session.

According to one or more particular embodiments herein, a tangible, non-transitory, computer-readable medium herein may store program instructions that cause a computer to execute a process comprising: determining that a new epoch has occurred within a communication session, wherein the communication session has one or more member devices; generating, in response to the new epoch, a new key encryption key and a key bundle comprising one or more keys to decrypt content of the communication session from one or more previous epochs of the communication session; encrypting the key bundle with the new key encryption key to create an encrypted key bundle; and sharing the encrypted key bundle with the one or more member devices to allow the one or more member devices to access the content of the communication session from the one or more previous epochs.

Further, according to one or more particular embodiments herein an apparatus herein may comprise: one or more network interfaces; a processor coupled to the one or more network interfaces and configured to execute one or more processes; and a memory configured to store a process that is executable by the processor, the process when executed configured to: determine that a new epoch has occurred within a communication session, wherein the communication session has one or more member devices; generate, in response to the new epoch, a new key encryption key and a key bundle comprising one or more keys to decrypt content of the communication session from one or more previous epochs of the communication session; encrypt the key bundle with the new key encryption key to create an encrypted key bundle; and share the encrypted key bundle with the one or more member devices to allow the one or more member devices to access the content of the communication session from the one or more previous epochs.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   determining, by a device of a communication session among one or more member devices, that a new epoch has occurred within the communication session due to addition of a member device to the communication session or removal of a member device from the communication session to result in a new set of member devices for the new epoch, wherein the communication session has one or more previous epochs prior to the new epoch;
   generating, by the device and in response to the new epoch in the communication session, a new key encryption key and a key bundle comprising one or more content keys sufficient to decrypt current content of the communication session and previous content of the communication session from the one or more previous epochs of the communication session;
   encrypting, by the device, the key bundle with the new key encryption key to create an encrypted key bundle wherein the key bundle is based on hierarchical content keys, and wherein the key bundle comprises a subset of a plurality of content keys from at least a last epoch of the one or more previous epochs of the communication session, the subset of the plurality of content keys sufficient to allow derivation of a remainder of the plurality of content keys from at least the last epoch; and
   sharing, from the device, the encrypted key bundle with the new set of member devices to allow the new set of member devices of the communication session to access the current content of the communication session from the new epoch and previous content of the communication session from the one or more previous epochs.

2. The method as in claim 1, wherein the key bundle is based on independent content keys, and wherein the key bundle comprises all of a plurality of content keys from at least a last epoch of the one or more previous epochs of the communication session.

3. The method as in claim 1, wherein the key bundle comprises a last key encryption key for a last key bundle for a last epoch of the communication session, wherein the one or more member devices are configured to daisy-chain backward to obtain one or more further previous key encryption keys for one or more corresponding further previous key bundles for one or more further previous epochs of the communication session.

4. The method as in claim 1, wherein the key bundle comprises all previous key encryption keys from all previous epochs of the communication session.

5. The method as in claim 1, wherein the key bundle comprises all previous content keys from all previous epochs of the communication session.

6. The method as in claim 1, wherein sharing the encrypted key bundle occurs either within the communication session or through a server access.

7. The method as in claim 1, wherein sharing further comprises:
   distributing information that allows the one or more member devices to derive the new key encryption key.

8. The method as in claim 1, wherein determining that the new epoch has occurred within the communication session is either caused by the device or detected by the device.

9. The method as in claim 1, wherein determining that the new epoch has occurred within the communication session is based on a change in the one or more member devices selected from a group consisting of: an existing member of the one or more member devices changing membership; and an external joining member into the one or more member devices.

10. The method as in claim 1, wherein the key bundle is one of either per-sender or per-group.

11. The method as in claim 1, further comprising, in response to a particular member device leaving the communication session prior to an end of the communication session:
   sharing, after the end of the communication session, a final encrypted key bundle of the communication session with the particular member device to allow the particular member device to access a remainder of content of the communication session occurring after the particular member device left the communication session.

12. A tangible, non-transitory, computer-readable medium storing program instructions that cause a computer to execute a process comprising:
   determining, in a communication session among one or more member devices, that a new epoch has occurred within the communication session due to addition of a member device to the communication session or removal of a member device from the communication session to result in a new set of member devices for the new epoch, wherein the communication session has one or more previous epochs prior to the new epoch;
   generating, in response to the new epoch in the communication session, a new key encryption key and a key bundle comprising one or more content keys sufficient to decrypt current content of the communication session and previous content of the communication session from the one or more previous epochs of the communication session;

encrypting the key bundle with the new key encryption key to create an encrypted key bundle wherein the key bundle is based on hierarchical content keys, and wherein the key bundle comprises a subset of a plurality of content keys from at least a last epoch of the one or more previous epochs of the communication session, the subset of the plurality of content keys sufficient to allow derivation of a remainder of the plurality of content keys from at least the last epoch; and sharing the encrypted key bundle with the new set of member devices to allow the new set of member devices of the communication session to access the current content of the communication session from the new epoch and previous content of the communication session from the one or more previous epochs.

13. The tangible, non-transitory, computer-readable medium storing the program instructions as in claim 12, wherein the key bundle is based on independent content keys, and wherein the key bundle comprises all of a plurality of content keys from at least a last epoch of the one or more previous epochs of the communication session.

14. The tangible, non-transitory, computer-readable medium storing the program instructions as in claim 12, wherein the key bundle comprises a last key encryption key for a last key bundle for a last epoch of the communication session, wherein the one or more member devices are configured to daisy-chain backward to obtain one or more further previous key encryption keys for one or more corresponding further previous key bundles for one or more further previous epochs of the communication session.

15. The tangible, non-transitory, computer-readable medium storing the program instructions as in claim 12, wherein the key bundle comprises all previous key encryption keys from all previous epochs of the communication session.

16. The tangible, non-transitory, computer-readable medium storing the program instructions as in claim 12, wherein the key bundle comprises all previous content keys from all previous epochs of the communication session.

17. The tangible, non-transitory, computer-readable medium storing the program instructions as in claim 12, wherein sharing the encrypted key bundle occurs either within the communication session or through a server access.

18. An apparatus, comprising:

one or more network interfaces;

a processor coupled to the one or more network interfaces and configured to execute one or more processes; and a memory configured to store a process that is executable by the processor, the process when executed configured to:

determine, in a communication session among one or more member devices, that a new epoch has occurred within the communication session due to addition of a member device to the communication session or removal of a member device from the communication session to result in a new set of member devices for the new epoch, wherein the communication session has one or more previous epochs prior to the new epoch;

generate, in response to the new epoch in the communication session, a new key encryption key and a key bundle comprising one or more content keys sufficient to decrypt current content of the communication session and previous content of the communication session from the one or more previous epochs of the communication session;

encrypt the key bundle with the new key encryption key to create an encrypted key bundle wherein the key bundle is based on hierarchical content keys, and wherein the key bundle comprises a subset of a plurality of content keys from at least a last epoch of the one or more previous epochs of the communication session, the subset of the plurality of content keys sufficient to allow derivation of a remainder of the plurality of content keys from at least the last epoch; and share the encrypted key bundle with the new set of member devices to allow the new set of member devices of the communication session to access the current content of the communication session from the new epoch and previous content of the communication session from the one or more previous epochs.

\* \* \* \* \*